United States Patent
Sajeepa et al.

(10) Patent No.: US 9,965,441 B2
(45) Date of Patent: May 8, 2018

(54) ADAPTIVE COALESCING OF REMOTE DIRECT MEMORY ACCESS ACKNOWLEDGEMENTS BASED ON I/O CHARACTERISTICS

(71) Applicant: CISCO TECHNOLOGY, INC., San Jose, CA (US)

(72) Inventors: Prabhath Sajeepa, San Jose, CA (US); Sagar Borikar, San Jose, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 196 days.

(21) Appl. No.: 14/965,736

(22) Filed: Dec. 10, 2015

(65) Prior Publication Data
US 2017/0168986 A1 Jun. 15, 2017

(51) Int. Cl.
*G06F 13/00* (2006.01)
*G06F 15/173* (2006.01)
*G06F 13/28* (2006.01)
*G06F 13/42* (2006.01)

(52) U.S. Cl.
CPC ........ *G06F 15/17331* (2013.01); *G06F 13/28* (2013.01); *G06F 13/4282* (2013.01)

(58) Field of Classification Search
CPC .................... G06F 13/28; G06F 15/17331
See application file for complete search history.

(56) References Cited

U.S. PATENT DOCUMENTS

| | | | |
|---|---|---|---|
| 2002/0152315 A1* | 10/2002 | Kagan | G04G 21/00 709/227 |
| 2005/0165985 A1 | 7/2005 | Vangal et al. | |
| 2008/0037555 A1 | 2/2008 | Biran et al. | |
| 2008/0091868 A1 | 4/2008 | Mizrachi et al. | |

OTHER PUBLICATIONS

Huggahalli, et al., "Direct Cache Access for High Bandwidth Network I/O," IEEE Computer Society, vol. 33, Issue 2, May 2005, 10 pages.
"InfiniBand Architecture Release 1.1," InfiniBand Trade Association, vol. 1, General Specifications, Nov. 6, 2002, 3 pages.
"InfiniBand Architecture Specification vol. 1," InfiniBand Trade Association, Release 1.1, Nov. 6, 2002, 1303 pages.
"RDMA Aware Networks Programming User Manual," Mellanox Technologies, Copyright © 2015, 216 pages.

* cited by examiner

*Primary Examiner* — Zachary K Huson
(74) *Attorney, Agent, or Firm* — Polsinelli PC

(57) ABSTRACT

An example method for adaptively coalescing remote direct memory access (RDMA) acknowledgements is provided. The method includes determining one or more input/output (I/O) characteristics of RDMA packets of a plurality of queue pairs (QPs) on a per-QP basis, each QP identifying a respective RDMA connection between a respective first compute node and a respective second compute node. The method further includes determining an acknowledgement frequency for providing acknowledgements of the RDMA packets on a per-QP basis (i.e., a respective acknowledgement frequency is set for each QP) based on the determined one or more I/O characteristics for each QP.

17 Claims, 10 Drawing Sheets

| Opcode 502 | OP id 504 | vNIC 506 | Flow match 508 | Time stamp 510 | Byte count 512 | Pck count 514 | Action 516 |
|---|---|---|---|---|---|---|---|
| SEND First | 1028 | 7 | | | | | |
| SEND Mid | 1028 | 7 | | | | | |
| SEND Last | 1028 | 7 | | | | | |
| SEND Only | 1028 | 7 | | | | | |
| WRITE First | 1028 | 7 | | | | | |
| WRITE Mid | 1028 | 7 | | | | | |
| WRITE Last | 1028 | 7 | | | | | |
| WRITE Only | 1028 | 7 | | | | | |
| | | | | | | | |

FT Key 518 — OP id 504, (spans Opcode/OP id)
FT match criteria 520 — vNIC 506, Flow match 508
FT update for every packet 522 — Time stamp 510, Byte count 512, Pck count 514
Opcode specific Microcode 524 — Action 516

| Payload type | Payload size | Weight |
|---|---|---|
| Tiny payload | <= 512 | 10 |
| Very Small payload | 512 < payload <= 1024 | 20 |
| Small Payload | 1024 < payload <= 2048 | 30 |
| Moderate payload | 2048 < payload <= 4096 | 40 |
| Average payload | 4096 < payload <= 8192 | 60 |
| Large payload | 8192 < payload <= 16384 | 80 |
| Very Large payload | Payload > 16384 | 100 |

| Coalescing Factor | Traffic type | Ack Frequency |
|---|---|---|
| 1 < CF <= 10 | Ultra low latency | 1 |
| 10 < CF <= 20 | Low latency | 2 |
| 20 < CF <= 40 | Moderate latency | 4 |
| 40 < CF <= 60 | Moderate Throughput | 8 |
| 60 < CF <= 80 | High throughput | 16 |
| 80 < CF <= 100 | Very High Throughput | 32 |

ADAPTIVE COALESCING OF REMOTE DIRECT MEMORY ACCESS ACKNOWLEDGEMENTS BASED ON I/O CHARACTERISTICS

TECHNICAL FIELD

This disclosure relates in general to the field of communications and, more particularly, to adaptive coalescing of remote direct memory access (RDMA) acknowledgements based on input/output (I/O) characteristics of RDMA traffic.

BACKGROUND

A typical enterprise network, which can include data centers, contains myriad network elements, including hosts, load balancers, routers, switches, etc. The network connecting the network elements provides secure user access to various services and an infrastructure for deployment, interconnection, and aggregation of shared resource as required, including applications, hosts, appliances, and storage. Improving operational efficiency and optimizing utilization of resources in such networks are some of the challenges facing network operators. Network operators want a resilient infrastructure that consistently supports diverse applications and services and protects the applications and services against disruptions. The application workloads deployed in a typical datacenter can have varying level of latency and bandwidth requirements, which have to be supported by the network infrastructure. A properly planned and operating network provides application and data integrity and optimizes application availability and performance.

Remote Direct Memory Access (RDMA) technology enables data transfers between compute nodes with minimal central processing unit (CPU) overhead and low latency. Because of this virtue, RDMA deployments are becoming popular in modern enterprise networks. Improvements in RDMA implementations are always desirable.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 5 is a simplified block diagram illustrating an ingress flow table format for facilitating adaptive coalescing of RDMA acknowledgements in accordance with one example embodiment;

FIG. 6 is a simplified block diagram illustrating criteria for assigning weights used in determination of a coalescing factor based on an average payload size in accordance with one example embodiment;

FIG. 7 is a simplified block diagram illustrating criteria for determining an acknowledgment frequency for a particular QP based on a Coalescing Factor determined for the QP in accordance with one example embodiment;

DETAILED DESCRIPTION OF EXAMPLE EMBODIMENTS

Overview

Figure 1:
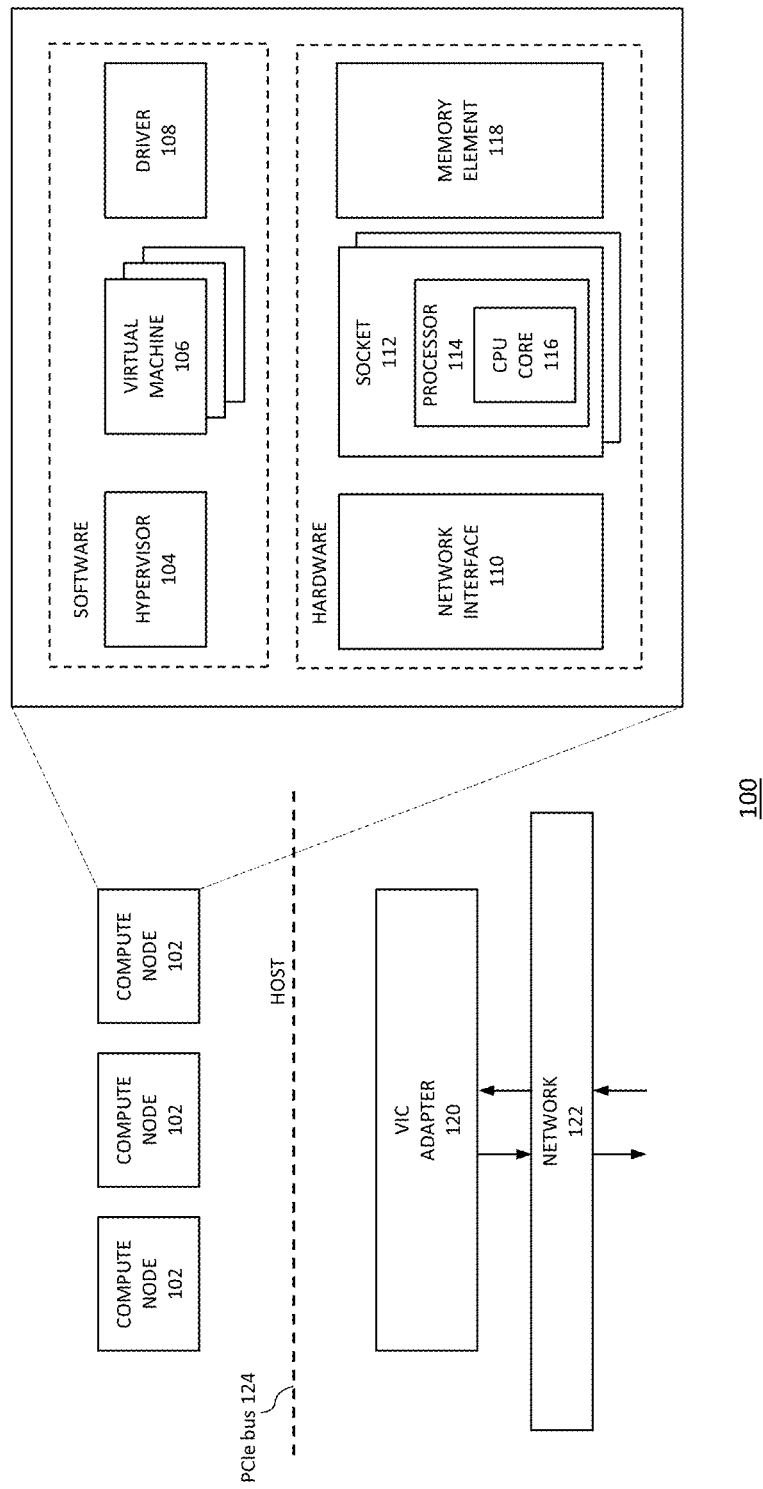
FIG. 1 is a simplified block diagram illustrating a communication system for facilitating adaptive coalescing of RDMA acknowledgements in accordance with one example embodiment.

One aspect of the present disclosure provides a computer-implemented method, referred to herein as an "adaptive coalescing method," for setting the frequency of sending acknowledgements (ACKs) to RDMA requests based on input/output (I/O) characteristics of RDMA traffic on a per-Queue Pair (QP) basis. The method includes determining one or more I/O characteristics of RDMA packets of a plurality of QPs on a per-QP basis (i.e., determining I/O characteristics of RDMA packets belonging to each QP separately from determining I/O characteristics of RDMA packets belonging to other QPs), each QP identifying a respective RDMA connection between a respective first compute node and a respective second compute node. The method further includes determining an acknowledgement frequency for providing acknowledgements of the RDMA packets on a per-QP basis (i.e., a respective acknowledgement frequency is set for each QP) based on the determined one or more I/O characteristics.

In this context, "coalescing" refers to the fact that, instead of sending an individual acknowledgement to each RDMA that requires an acknowledgement, a certain number of such acknowledgements could be combined (i.e. coalesced) into a single acknowledgement that is then sent. The number of acknowledgements being combined depends on the set frequency, which in turn depends on the I/O characteristics of each QP. The term "adaptive" refers to the fact that the method allows changing (i.e. adapting) frequency of sending acknowledgements depending on a particular QP (i.e. different QPs could have different acknowledgement frequencies set for them) and depending on I/O characteristics of each particular QP at a particular time or a time period (i.e. a single QP could have different acknowledgement frequencies set at different times). Proposed approach allows the underlying RDMA transport to be adaptive when it comes to handling RDMA consumers with different I/O characteristics.

The method could be implemented by a functional entity referred to herein as an "adaptive ACK coalescing logic." Various parts of the method could be implemented by a Virtual Interface Card (VIC) adapter or any other network element associated with and/or communicatively coupled to the VIC adapter. Therefore, in various embodiments, the adaptive ACK coalescing logic, or part thereof, could be implemented within any of these network elements or/and distributed among a plurality of network elements.

As used herein, the term "compute node" refers to a hardware apparatus or a virtual machine, in which one or more applications (e.g., software programs), e.g. user applications, are executed, and which provides processing, memory, network and/or storage resources.

As will be appreciated by one of ordinary skill in the art, aspects of the present disclosure, in particular the functionality related to the adaptive ACK coalescing described herein, may be embodied as a system, a method or a computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Functions described in this disclosure may be implemented as an algorithm executed by a processor, e.g. a microprocessor, of a computer. Furthermore, aspects of the present disclosure may take the form of a computer program product embodied in one or more computer readable medium(s), preferably non-transitory, having computer readable program code embodied, e.g., stored, thereon. In various embodiments, such a computer program may, for example, be downloaded to the existing devices and systems (e.g. to the existing network elements such as the existing VIC adapters and various control nodes) or be stored upon manufacturing of these devices and systems.

Example Embodiments

Wide variety of distributed systems and applications use RDMA as primary interface for transport. For example, data center storage technologies have seen great performance improvements by using RDMA as transport protocol. Both file based and block based storage protocols have defined mappings to RDMA transport primitives. File transfer protocols such as Server Message Block (SMB) over RDMA and Network File System (NFS) over RDMA have evolved over a period of time and now offer a mature and stable alternative to file transfer over conventional Transmission Control Protocol/Internet Protocol (TCP/IP). Even block based protocols such as Internet Small Computer Systems Interface (iSCSI) and Small Computer Systems Interface (SCSI) can be transported over RDMA by making use of iSCSI Extensions for RDMA (iSER) and SCSI RDMA Protocol (SRP) respectively.

Apart from high bandwidth transport, RDMA can also offer low latency for applications aimed at High Performance Computing (HPC) and distributed cluster file systems. Since, in RDMA, compute nodes can exchange data and control information directly between applications and memory, by-passing the kernel, the application response latency is much lower compared to non-RDMA transport.

Examples described above illustrate that RDMA finds a place both in latency sensitive HPC environment and in storage ecosystems, e.g. in data centers, where high throughput is critical while latency is less critical. Embodiments of the present disclosure are based on recognition that differentiating between various settings in which RDMA is implemented is important for RDMA to be a viable transport for both HPC applications, which are latency sensitive, and data center environments, where high bandwidth and throughput for accessing storage systems are more important. In particular, embodiments of the present disclosure are based on an insight that input/output (I/O) characteristics of RDMA traffic of different applications, e.g. HPC applications and storage systems, are clearly different from one another, and, therefore, may be used to differentiate between RDMA configurations optimal for each of these different applications. In other words, I/O characteristics of RDMA traffic of a specific application could be used to adapt the RDMA transport configuration for the traffic of this application, enabling implementations where the underlying RDMA transport is aware of and is adaptive to application specific requirements. Adaptive coalescing method presented herein uses an acknowledgement rate for providing acknowledgements of RDMA requests as a parameter of the underlying RDMA transport configuration that is adapted based on I/O characteristics of traffic for a particular application. The following section describes basics of RDMA acknowledgements in greater detail.

The InfiniBand™ Architecture Specification, an example of which is InfiniBand™ Architecture Specification Volume 1 Release 1.2.1 has defined several types of RDMA services that are available for the consumers. One of them is a "reliable service", which provides a guarantee that messages are delivered from a Requestor network element to a Responder network element in order and without corruption. A sub-type of reliable service which is most commonly used is "Reliable Connection", where end points exchange their capabilities at the beginning and establish a dedicated connection. An entity called Queue Pair (QP) is associated with the connection between the end points and provides an interface to send RDMA commands and receive RDMA packets carrying data. In case of Reliable Service, a pending transaction, commonly referred to as a Work Request (WR), is considered complete, when the Requestor receives acknowledgement from the Responder.

Currently existing implementations of RDMA offer a constant rate of WR (or I/O) completion. Consequently, the effective latency for both latency sensitive and high throughput applications are the same. Even if a particular application is transferring bulk data, the Responder is going to send an acknowledgement for every command or at a static coalescing factor, resulting in the Requester getting interrupted for every acknowledgement or for every fixed number of acknowledgements, and for every command completion received from the Responder.

In contrast, adaptive coalescing method described herein enables a Responder to adaptively coalesce the acknowledgements, i.e. combine acknowledgements for multiple requests over a particular connection into a single acknowledgement sent to the Requestor based on I/O characteristics of the RDMA traffic exchanged for the connection (i.e. adaptively), thereby reducing the interrupt overhead and processor utilization at the Requestor, yielding a better performance overall. Methods and systems described herein provide a greater flexibility by allowing VIC adapters to control the rate of sending RDMA acknowledgements on a per Queue Pair basis, since different QPs belonging to same adapter may be participating in I/O operations with different characteristics.

The following section provides a general explanation of RDMA implementation on a VIC adapter.

Turning to FIG. 1, FIG. 1 is a simplified block diagram illustrating a communication system 100 for facilitating adaptive coalescing of RDMA acknowledgements in accordance with one example embodiment. The communication system 100 includes a plurality of compute nodes 102 that provide processing, memory, network and/or storage resources to run instances of various user applications, virtual machines, etc. Such compute nodes are sometimes, interchangeably, referred to as hosts or requestors/responders, to indicate that actions described herein as being performed by compute nodes can be performed either by hardware devices or systems or by software running on such hardware devices or systems.

In a general sense, compute nodes 102 comprise (e.g., include, hold, contain, run, host, etc.) computing resources that can carry out various processing, memory, network and/or storage functions. For example, as shown in FIG. 1 with an inset for the right-most compute node 102, a compute node may run a hypervisor 104 (including its associated driver), various virtual machine instances 106, and can have one or more network interfaces 110 that enable network connectivity according to a network driver 108.

The term "driver" is typically used to describe any type of system software used to drive hardware. The network driver 108 may comprise a software implementation of network protocols, such as Ethernet, RDMA over Converged Ethernet, etc. and can be controlled by an operating system of the compute node 102 to communicate over the network interface 108).

Although shown as a separate element in FIG. 1, in various embodiments the network driver 108 may also execute inside an associated one of virtual machine instances 106 and/or be a part of or communicatively connected to a VIC adapter 120. In addition, although shown to be included within the compute node 102, in other embodiments the network driver 108 may be implemented separately from (i.e. not be included within) but be associated with (e.g. communicatively connected to and configured to operate with) a compute node 102. In the following, the network driver 108 is sometimes referred to as a "host driver" to indicate that it is associated with, and may or may not be included within, a compute node/host.

In various embodiments, each of the compute nodes 102 may further contain one or more sockets 112 (e.g., socket refers to a hardware receptacle that enables a collection of CPU cores with a direct pipe to memory), each socket holding at least one processor 114, each processor comprising one or more Central Processing Unit (CPU) cores 116, each CPU core executing instructions (e.g., computations, such as Floating-point Operations Per Second (FLOPS)). Each of the compute nodes 102 may also include a memory element 118 which may store data and facilitate operations of CPU cores 116.

The VIC adapter 120 shown in FIG. 1 is configured to facilitate communication to and from each of the compute nodes 102, either between each other or with other compute nodes communicatively connected over a network 122. The latter computer nodes are not shown in FIG. 1, but it may be envisioned that such compute nodes are provided in a configuration analogous to that shown in FIG. 1 for one side of the network 122 (i.e. if the architecture of FIG. 1 was mirrored with respect to the network 122). Although FIG. 1 illustrates a common VIC adapter for multiple compute nodes 102, in other embodiments, multiple VIC adapters may be implemented, either as an individual VIC adapter per compute node or a VIC adapter per a subset of compute nodes.

In a general sense, network traffic between compute nodes 102 and the network 122 (i.e. traffic between the compute nodes 102 shown in FIG. 1 and compute nodes which may be connected on the other side of the network 122) may be termed as "North-South Traffic", while network traffic among compute nodes 102 shown in FIG. 1 may be termed as "East-West Traffic". Note that compute nodes in communication with one another may be, and typically are, unaware of the physical location of other compute nodes, for example whether they exist in the same local network, or are in another network, connected over the network 122. Thus, compute nodes described herein are agnostic to the direction of network traffic they originate or terminate, such as whether the traffic is North-South, or East-West because the network driver 108 is typically unaware of the location of the peer node and may use the same addressing mechanism (e.g., L2 Ethernet MAC address or L3 IP address) for addressing nodes located e.g. in same microserver chassis or located in a remote node in same L2/L3 domain. Irrespective of the direction of the network traffic, the VIC adapter 120 presents a uniform interface to compute nodes for both North-South traffic and East-West traffic. Furthermore, embodiments of coalescing of acknowledgements described herein are not limited to microserver architectures.

A Peripheral Component Interconnect Express (PCIe) bus 124 may facilitate communication between the VIC adapter 120 and one or more VIC host drivers 108. To that end, the VIC adapter 120 may create a virtual Network Interface Card (vNIC) (not shown in FIG. 1) that can be associated with a specific host driver 108 and an application executing in one of the compute node 102. Each host driver 108 may comprise an RDMA engine for managing RDMA related operations.

The VIC adapter 120 is a PCIe based Converged Network Adapter (CNA) deployed on certain blade and rack servers in a network environment. The VIC adapter provides high speed (e.g., 10G/40G) input/output (I/O) interfaces (e.g., VNICs) for network and storage traffic. While greater details regarding the VIC adapter 120 are provided below with reference to FIG. 2, in general, such VIC adapters can enable RDMA functionality by supporting packet classification and dynamic modification of packet headers. The VIC adapter has packet processors that can execute microcode routines at ingress/egress for substantially every packet. The microcode routines perform various RDMA functions, such as DMA of ingress data directly into host memory based on a virtual address mentioned in a packet header, inserting/deleting RDMA transport and link layer headers and performing packet checks for sequence number and Cyclic Redundancy Check (CRC).

For purposes of illustrating the techniques of the communication system 100, it is important to understand the communications that may be traversing the system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

Direct memory access (DMA) is an ability of a device to access local host memory directly, without the intervention of any CPU(s). RDMA is the ability of accessing (e.g., reading from or writing to) memory on a remote machine without interrupting the processing of the CPU(s) on the remote machine. RDMA enables data transfers between the compute nodes 102 with minimal processor overhead and low latency. Hence, RDMA deployments are increasingly popular in modern data centers. RDMA is also being increasingly used in Hadoop™ and/or Big Data deployments, in which low latency is advantageous for Map Reduce and Remote Procedure Call (RPC) operations. Various distributed file systems like Ceph™ and GlusterFS™ can take advantage of RDMA for inter-node communication within a cluster of files. Windows® hypervisor prefers RDMA for live migration of virtual machines, as it is well-established that virtual machines can be migrated over RDMA enabled interconnects in short time with minimal processor utilization.

RDMA communication is based on a set of three queues: (i) a send queue and (ii) a receive queue, comprising a Queue Pair (QP) and (iii) a Completion Queue (CQ). Posts in the QP are used to initiate the sending or receiving of data. An application (e.g., driver) places instructions on its work queues that generate buffers in the VIC adapter to send or receive data. The instructions comprise structures called work requests or Work Queue Elements (WQEs) that include a pointer to the buffer (e.g., a WQE placed on the send queue contains a pointer to the message to be sent; a pointer in the WQE on the receive queue contains a pointer to a buffer where an incoming message can be placed). The VIC adapter consumes WQE from the send queue at the egress side and streams the data from the application buffers to the remote system. When data arrives at the remote system (i.e. at the TCA), the remote VIC adapter consumes the WQEs at the receive queue at the ingress side and places the received data in appropriate application buffer which could be represented by memory regions. In case of RDMA SEND/RECV, the VIC adapter uses the SEND/RECV operation to transfer control messages, which may or may not belong to any memory region. The SEND/RECV buffers are application provided buffers, comprising different memory spaces in adapter memory. RDMA can work over a network using one of three protocols: RDMA over Converged Ethernet (RoCE), Infiniband and Internet Wide Area RDMA Protocol (iWARP). For example, RoCE is a network protocol that allows RDMA over an Ethernet network, with encapsulation of RDMA primitives in Ethernet packets, such that the RDMA traffic is treated as any other Ethernet traffic.

Figure 2:
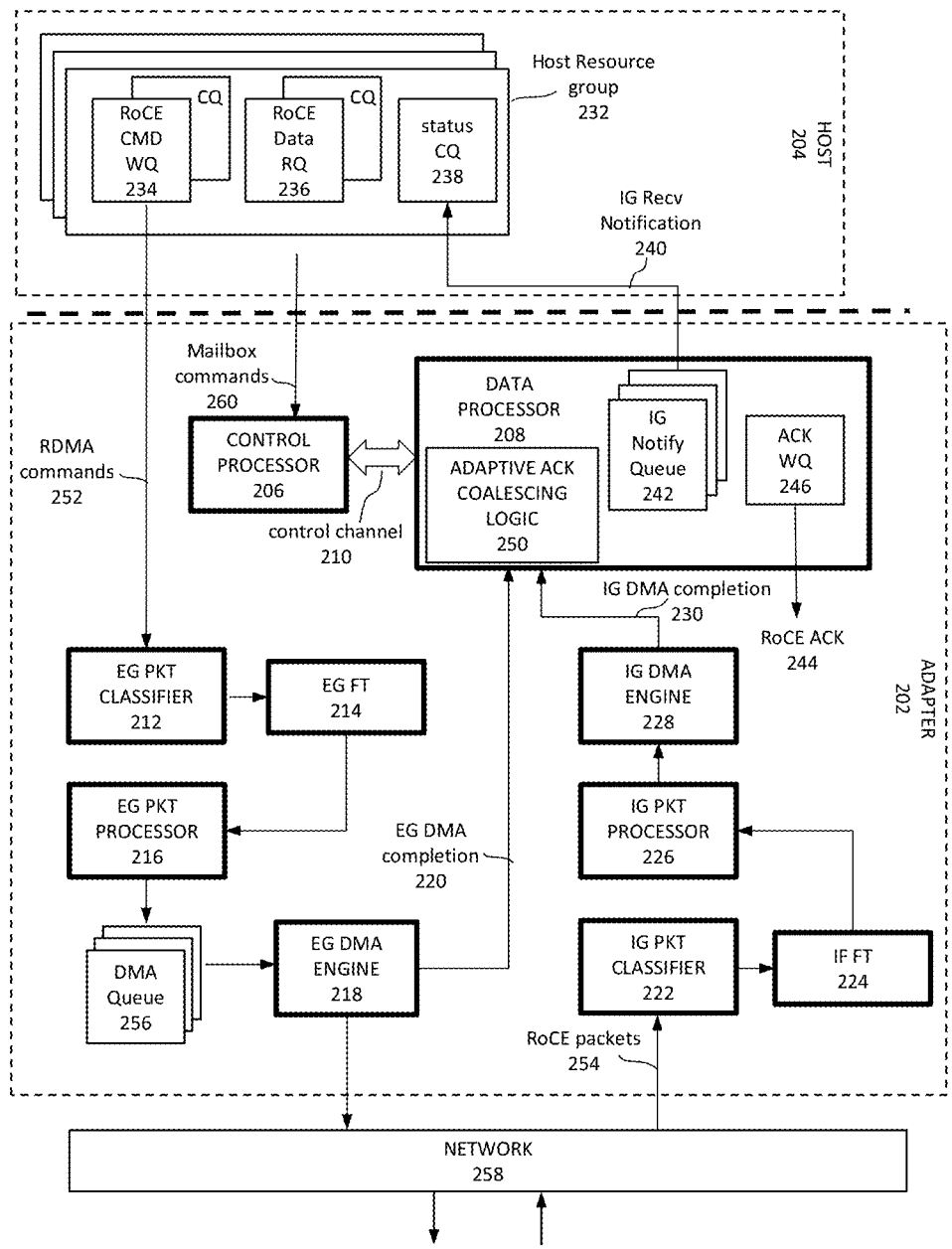
FIG. 2 is a simplified block diagram illustrating other example details of embodiments of the communication system of FIG. 1.

Embodiments described herein mainly focus on Reliable, Connection Oriented (RC) transport interface of RDMA, in particular on implementation of RoCE on VIC adapters. FIG. 2 is a simplified block diagram 200 illustrating functional blocks of a VIC adapter 202 configured to support RDMA transport. The VIC adapter 202 may be implemented as the VIC adapter 120 shown in FIG. 1. The system 200 shown in FIG. 2 is a more detailed illustration of an embodiment of the communication system 100 shown in FIG. 1. Therefore, all of the discussions provided with respect to FIG. 1 are applicable to the architecture show in FIG. 2.

The VIC adapter 202, typically implemented as a firmware and capable of supporting RDMA, creates various resources in hardware that are used to handle ingress and egress RDMA data flows. The virtual network interface card (vNIC) is associated with a group of hardware queues to receive commands from a host 204, handle incoming RDMA work requests, command completions, acknowledgements and other protocol related communications. In this context, the host 204 refers to e.g. one of the compute nodes 102 described above or an application on one of the compute nodes 102. In particular, each vNIC may be associated with PCIe end point on the compute node 102, represented by PCI identifier (Bus:Device:Function)

As shown in FIG. 2, the VIC adapter 202 includes a control processor 206, a data path processor 208, a control channel 210 between the control and data processors, an egress (EG) packet classifier 212, an ingress (IG) packet classifier 222, an egress flow table 214, an ingress flow table 224, an egress packet processor 216, an ingress packet processor 226, an egress DMA engine 218, an ingress DMA engine 228.

As also shown in FIG. 2, the host 204 includes a plurality of Host Resource Groups 232, each resource group 232 comprising a RoCE command (CMD) Work Queue (WQ) 234, an RoCE Data Response Queue (RQ) 236, and a status Completion Queue (CQ) 238. Each resource group 232 represents hardware resources, such as e.g. resources 234, 236, and 238 shown in FIG. 2. A user can use specialized management software to indicate how many Resource Groups should be associated with a single network interface, such as e.g. network interface 110 (there could be multiple network interfaces 110 per physical VIC adapter). For example, if a user specifies that 4 Resource Groups are to be created for a given network interface, then the firmware will create 4 sets of hardware resources and associate them with the network interface. At this point, a host driver, such as the host driver 108, typically implemented as software running on the compute node 102, will be able to discover those hardware resources and will be able to make use of it, thus managing the network interface 110.

The control processor 206 is typically responsible for configuration of RDMA resources on behalf of a network interface, e.g. the network interface 110 shown in FIG. 1. To that end, the control processor 206 is configured to allocate Work Queues (WQs), Response Queues (RQs) and Completion Queues (CQs) to be used by the host driver, e.g. the host driver 108. The control processor is also configured to allocate memory of the adapter 202 (memory not individually shown in FIG. 2) and maps it to the host 204. The control processor 206 is also configured to invoke initialization of fast path structures used by the data path processors 208.

The data path processor 208 is configured to notify the host 204 after incoming data is placed, by DMA, into host memory (not shown in FIG. 2) for channel operations. This is illustrated in FIG. 2 with an Ingress (IG) Received (Recv) Notification 240 sent from an IG notify queue 242 to the status CQ 238 in the host 204.

The data path processor 208 is also configured to handle errors when the incoming packet does not follow proper protocol syntax or semantics.

The data path processor 208 is further configured to generate acknowledgement (ACK) packets for the incoming requests. This is illustrated in FIG. 2 with RoCE ACK 244 originating from a ACK WQ 246.

In some embodiments, the host driver may use a mailbox command to instruct the VIC adapter 202 to create a QP in a particular RoCE mode in the VIC adapter, as shown in FIG. 2 with a mailbox command 260 provided to the control processor 206 of the VIC adapter 202.

Figure 3:
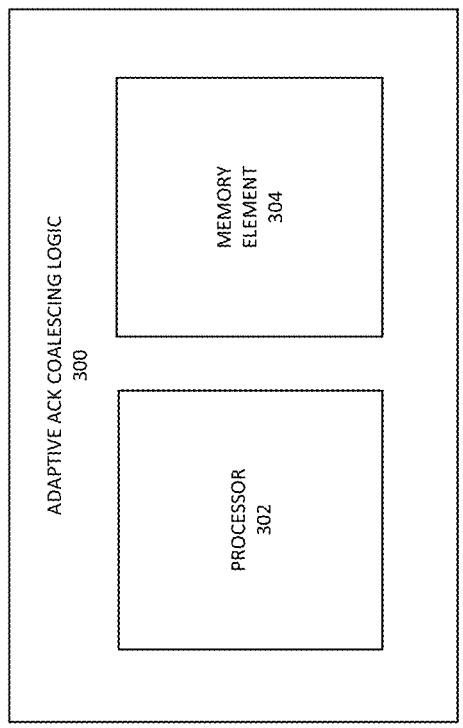
FIG. 3 illustrates a logical entity for assisting adaptive ACK coalescing in a network environment, according to some embodiments of the present disclosure.

In order to implement adaptive coalescing methods as described herein, the VIC adapter 202 includes an adaptive ACK coalescing logic 250, which could e.g. be implemented as a part of the data processor 208, as shown in FIG. 2. The adaptive ACK coalescing logic 250 may be considered to include at least one processor and at least one memory element, as shown in FIG. 3, configured to facilitate various operations described herein. The processor may execute logic to coalesce the acknowledgement packets. Software routines could be configured to sample, e.g. periodically sample, the incoming traffic rate and decide on the coalescing parameters for every QP, as described in greater detail below.

In various embodiments, the logic 250 is configured to carry out adaptive coalescing methods described herein, or configured to ensure that such methods are used to send ACKs to RDMA requests. It should be noted that various repositories may be associated with the logic 250, not shown in FIG. 2. Furthermore, even though the logic 250 is illustrated in FIG. 2 as included within the data processor 208, in other embodiments, functionality of the logic 250 may be included in a different, separate network element or be distributed over a plurality of network elements, e.g. part of the adaptive coalescing methods could be performed by the packet classifiers and flow tables.

In a general sense, the logic 250 may be implemented as a network element 300 shown in FIG. 3. The logical entity 300 may be considered to illustrate an exemplary internal structure associated with the logic 250, as well as with any other elements shown in FIG. 2, which is meant to encompass network appliances, servers, routers, switches, gateways, bridges, loadbalancers, firewalls, processors, modules, or any other suitable device, component, element, or object operable to exchange information that facilitates or otherwise helps to provide adaptive ACK coalescing as described herein. In other embodiments, these operations and/or features may be provided external to these elements, or included in some other network device/element or a plurality of elements to achieve this intended functionality. Alternatively, one or more of these elements can include software (or reciprocating software) that can coordinate in order to achieve the operations and/or features, as outlined herein. In still other embodiments, one or more of these elements may include any suitable algorithms, hardware, software, components, modules, interfaces, or objects that facilitate the operations thereof. This may be inclusive of appropriate algorithms and communication protocols that allow for the effective exchange of data or information.

As shown in FIG. 3, the logic 300 may include at least one processor 302 and at least one memory element 304, along with any other suitable hardware and/or software to enable its intended functionality of adaptive ACK coalescing as described herein. Similarly, each of the control processor 206, the classifiers 212 and 222, the FTs 214 and 224, the packet processors 216 and 226, and the DMA engines 218 and 228 may include memory elements for storing information to be used in achieving the adaptive ACK coalescing operations as outlined herein, and a processor that can execute software or an algorithm to perform the adaptive ACK coalescing activities as discussed in this Specification. Any of these devices may further keep information in any suitable memory element [e.g., random access memory (RAM), read only memory (ROM), an erasable programmable read only memory (EPROM), application specific integrated circuit (ASIC), etc.], software, hardware, or in any other suitable component, device, element, or object where appropriate and based on particular needs. Any of the memory items discussed herein should be construed as being encompassed within the broad term "memory element." The information being tracked or sent to the logic 250/300, the control processor 206, the classifiers 212 and 222, the FTs 214 and 224, the packet processors 216 and 226, and the DMA engines 218 and 228 could be provided in any database, register, control list, cache, or storage structure, all of which can be referenced at any suitable timeframe. Any such storage options may be included within the broad term "memory element" as used herein. Similarly, any of the potential processing elements, modules, and machines described herein should be construed as being encompassed within the broad term "processor." Each of the network elements and compute nodes can also include suitable interfaces for receiving, transmitting, and/or otherwise communicating data or information in a network environment.

Note that in certain example implementations, the adaptive ACK coalescing mechanisms as outlined herein may be implemented by logic encoded in one or more tangible media, which may be inclusive of non-transitory media, e.g., embedded logic provided in an ASIC, in DSP instructions, software (potentially inclusive of object code and source code) to be executed by a processor, or other similar machine, etc. In some of these instances, memory elements, such as e.g. memory 304 shown in FIG. 3, can store data or information used for the operations described herein. This includes the memory elements being able to store software, logic, code, or processor instructions that are executed to carry out the activities described herein. A processor can execute any type of instructions associated with the data or information to achieve the operations detailed herein. In one example, the processors, such as e.g. processor 302 shown in FIG. 3, could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), a digital signal processor (DSP), an EPROM, EEPROM) or an ASIC that includes digital logic, software, code, electronic instructions, or any suitable combination thereof.

Returning back to FIG. 2, the egress and ingress packet classifiers 212 and 222 are configured to trap, respectively, outgoing RDMA commands 252 and incoming RoCE packets 254 (outgoing and incoming from the perspective of the host 204), which commands and packets may be according to e.g. RoCE Version 1 (V1) or RoCE V2 protocols, RoCE V2 protocol including RoCE over IPv6 protocol, depending on the configuration of the VIC adapter 202. These classifiers may be considered to be primary lookup tables, and result of the lookup performed by each of the classifiers is directed to a respective flow table, i.e. the result of the lookup performed by the EG packet classifier 212 is directed to the flow table 214 and the result of the lookup performed by the IG packet classifier 222 is directed to the flow table 224, as indicated in FIG. 2 with arrows between these elements.

Each packet classifier 212, 222, is programmed with a set of entries, where each entry has set of match criteria and an action to be taken if there is a match.

For example, the IG packet classifier 222 is programmed with a set of entries, where each entry has set of match criteria and an action to be taken if an incoming packet matches the set of match criteria, where the action would typically be to pass the incoming packet to the IG flow table 224. As a result of matching the entries in the IG packet classifier 222, the IG packet classifier also provides a filter ID to the IG flow table 224, the filter ID indicating a type of an RDMA command (i.e. one of e.g. SEND, WRITE, or READ commands) that yielded the match in the entries of the IG packet classifier, for each incoming RDMA work request or response (i.e. for each incoming RoCE packet 254) received at the IG packet classifier 222. Thus, the filter ID provided by the IG packet classifier represents the operation (SEND, WRITE, READ, etc.) and, in combination with the QP ID, it provides an index into the IG flow table 224, i.e. an index as to which entry in the flow table 224 is to be matched.

On the other hand, the EG packet classifier 212 is programmed with a set of entries to be matched by the outgoing RDMA commands 252, such as e.g. RDMA READ, WRITE, SEND, etc. commands, as defined e.g. in the InfiniBand™ Specification. Matching of the entries in terms of the match criteria and action taken for the EG packet classifier 212 is similar to that described above for the IG packet classifier 222, and, therefore, in the interests of brevity is not repeated. Also similar to the IP packet classifier 222, the EG packet classifier 212 is configured to provide a filter ID indicating a particular outgoing RDMA command (i.e. one of e.g. SEND, WRITE, or READ commands) for each outgoing RDMA work request received at the VIC adapter, i.e. received at the EG packet classifier 212. The filter ID provided by the EG packet classifier 212 to the EG flow table 214 represents the outgoing operation (SEND, WRITE, READ, etc.) and, in combination with the QP ID, it provides an index into the EG FT 214, i.e. an index as to which entry in the EG flow table is to be matched.

The flow tables (FTs) 214 and 224 are configured to act as secondary lookup tables, where some fields in the packets received at the flow tables are matched against contents of the table and the match results in execution of microcode routines called "rewrite rules" by the EG packet processor 216 and the IG packet processor 226, respectively. These rewrite rules are used to encode and decode RoCE packets.

In order to assist in the adaptive coalescing of acknowledgements described herein, the flow tables 214 and 224 may be configured to measure I/O related parameters such as e.g. packet count, byte count and timestamp of the last seen packet. The flow tables 214 and 224 may also be configured to segregate the packets based on the opcode and classify the incoming I/O pattern as "channel oriented or "memory oriented" operations. The RDMA SEND operation is based on channel semantics and is mainly used to carry small, latency sensitive data. The RDMA WRITE/READ operations are based on memory semantic, where an application memory region (not shown in FIG. 2) is involved in data transfer. The memory semantic operations are mainly used for bulk data transfer requiring high throughput.

The egress and ingress packet processors 216 and 226 are configured to implement rewrite rules by running appropriate microcode routines. These microcode routines set up DMA contexts, initiate DMA transfers, transform headers of every outgoing packet, validate incoming RoCE packets and update QP context in adapter memory. DMA queue 256 is configured to hold the DMA work requests to be processed by the EG DMA engine 218. The DMA work requests are created based on the RDMA commands as they are executed on the EG packet processor 216.

The egress and ingress DMA engines 218 and 228 are used to move data from host memory to a network 258, e.g. the network 122 shown in FIG. 1, and vice versa. Each of the DMA engines 218 and 228 is configured to notify the data processor 208 upon completion of DMA operations, as shown with EG DMA completion 220 and IG DMA completion 230 arrows going from the DMA engines 218 and 228, respectively, to the data processor 208.

The control channel 210 between the control processor 206 and the data processor 208 provides a shared memory ring buffer to exchange control commands and logs between the control and data processors. The control processor 206 may pass information of QPs, base address of MR table shared between the host 204 and the adapter 202, and memory area where statistical data on that may need to be saved. When a particular QP is deleted, the control processor 206 sends a command to the data processor 208 for freeing up resources related to that QP.

Figure 4:
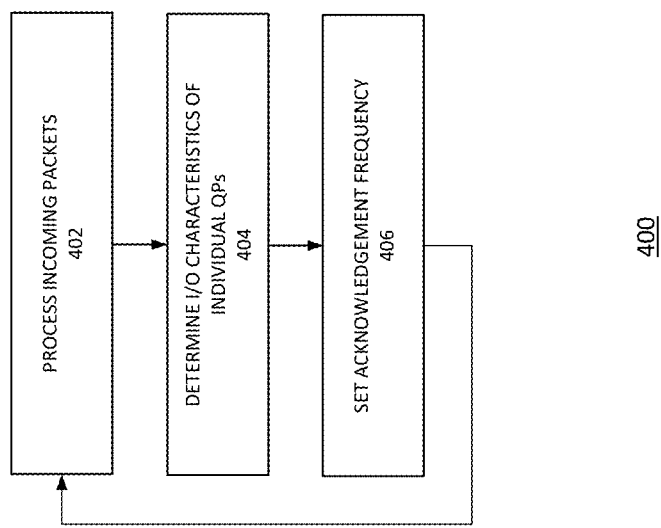
FIG. 4 is a simplified flow diagram illustrating example operations associated with adaptive coalescing of RDMA acknowledgements, according to some embodiments of the present disclosure.

FIG. 4 is a simplified flow diagram 400 illustrating example operations of the VIC adapter 202 associated with adaptive coalescing of RDMA acknowledgements, according to some embodiments of the present disclosure. The method 400 may begin with the adaptive ACK coalescing logic 250 processing the incoming RoCE packets 254 by passing them through the ingress packet classifier 222. During this processing, based on the RoCE opcode, packets are classified and channeled into the IG flow table 224. An example of such a flow table is illustrated in FIG. 5 as a flow table 500.

The flow table 500 on the ingress side has entries for each RoCE opcode 502 grouped by the QP identification (ID) number 504, where QP IDs identify specific connections between first and second compute nodes that exchange RDMA data. The ingress packets index into the flow table by using <opcode, QP id> as the key 518 (i.e. together, the RoCE opcode 502 and the QP ID 504 of each FT entry form a flow table key 518). In the example illustrated in FIG. 5, RDMA SEND and WRITE opcodes are used. In general, flow table entries may be created for all the other RoCE opcodes such as RDMA READ, READ RESPONSE and SEND & INVALIDATE as well.

Each entry in the FT 500 has set of match criteria 520, which, in the example shown in FIG. 5, includes the identification of the network interface (vNIC) 506 on which the packet has arrived and an L2, e.g. MAC, address of the remote QP, as indicated in FIG. 5 with a flow match 508 column (FIG. 5 not showing the actual flow match criteria in that column). If an incoming packet matches the set of match criteria 520, then this is a valid RoCE packet for the matching opcode. In this case, the VIC adapter updates the FT 500 with a timestamp 510 and a number of bytes in the packet (i.e. byte count) 512, and increments the number of packets (i.e. packet count) 514 for that RoCE packet (i.e. for the incoming RoCE packet of certain opcode type belonging to a particular QP ID). Thus, together, the timestamp 510, the byte count 512, and the packet count 514 of each FT entry form a FT update 522 for every packet.

Every flow table entry match is followed by an action 516 as specified in the entry. The action would typically be to run a microcode which handles the processing of the RoCE packet based on particular opcode. The microcode executes on an IG packet processor engine 226 and is responsible for admitting the payload of the packet into the host 204.

Examples of actions 516 are not filled in the table 500 shown in FIG. 5 in order to not clutter the drawing. The same holds for entries for the time stamp 510, byte count 512, and packet count 514.

The ingress flow table such as the one shown in FIG. 5 allows determining the frequency for ACK coalescing based on the ingress I/O pattern of a QP derived from such a flow table. To that end, turning back to the method 400 shown in FIG. 4, the adaptive ACK coalescing logic 250 may sample the information in the ingress flow table to determine I/O characteristics of data flows associated with individual QPs (box 404).

For example, the adaptive ACK coalescing logic 250 may be configured to sample the ingress FT, e.g. periodically, at certain predefined times which may be non-periodic, or when triggered by certain events, in order to determine such I/O characteristics.

Sampling the data of the active QPs in the IG FT effectively samples incoming RDMA traffic over a certain period of time because the data in the ingress FT represents data accumulated over a period of time. A sampling period may be defined as a time period between two subsequent sampling instances. In various embodiments, the sampling period may be predefined (i.e. static) or may be dynamically defined based on various parameters, such as e.g. be user-defined, be defined based on current or historic RDMA load, number of processing nodes available for processing RDMA requests, etc. For example, if the load generated by a particular QP is deemed to be latency sensitive, then the sampling period may be set so that the data in the ingress FT is sampled more frequently (i.e. sampling period is decreased).

As a result of sampling, the adaptive ACK coalescing logic 250 may determine, for each individual QP, one or more of the following exemplary I/O characteristics: I/O type, I/O rate, and I/O size. Of course, other embodiments may involve other or/and additional characteristics that may be of interest for setting ACK frequency for each individual QP, all of which embodiments are within the scope of the present disclosure.

Furthermore, the adaptive ACK coalescing logic 250 may assign a weight factor to each of the determined I/O characteristics (i.e. also on per-QP basis), which weight factor may then be used according to a suitable formula that combines the different I/O characteristics to determine the ACK frequency. While some examples of this are provided below, there are many possible ways of assigning such weights to different I/O characteristics, depending on relative importance of particular I/O characteristics that are selected for evaluation and depending on particular implementation, all of which are within the scope of the present disclosure.

With respect to an I/O characteristic being the I/O type, RDMA defines two I/O types. One type includes RDMA traffic that includes RDMA SEND operations, which are placed in the receive buffers in the order of arrival. These operations are known to have "Channel Semantics". The applications use these operations mainly to transfer small payload or control information. Another type includes bulk RDMA transfers using RDMA WRITE and READ operations. These operations are known to have "Memory Semantics", where data is directly transferred across application memories.

In one example embodiment, the adaptive ACK coalescing logic 250 may be configured to classify the I/O type of RDMA operations for each QP as belonging to one of these two categories, i.e. Channel Semantics or Memory Semantics, and assign a weight of e.g. "50" if the I/O type predominantly follows Channel Semantic and assign a weight of e.g. "100" if the I/O type predominantly follows Memory Semantic.

In general, the adaptive ACK coalescing logic 250 may be configured to classify the I/O type of RDMA operations for a particular QP as being of a particular type when the RDMA operations in the IG FT satisfy a certain condition. In case only two different types are defined, then the I/O type of RDMA operations for a particular QP is classified as being of the other type this condition is not satisfied.

For example, the adaptive ACK coalescing logic 250 may be configured to classify the I/O type of RDMA operations for a particular QP as being of the Channel Semantics type when the number of RDMA SEND operations in the IG FT is greater than a predefined threshold, e.g. more than 50% of the RDMA operations for that QP ID are RDMA SEND operations. Otherwise, the adaptive ACK coalescing logic 250 may be configured to classify the I/O type of RDMA operations for a particular QP as being of the Memory Semantics type.

In another example, the adaptive ACK coalescing logic 250 may be configured to classify the I/O type of RDMA operations for a particular QP as being of the Memory Semantics type when the number of RDMA READ and WRITE operations in the IG FT is greater than a predefined threshold, e.g. more than 50% of the RDMA operations for that QP ID are RDMA READ and WRITE operations. Otherwise, the adaptive ACK coalescing logic 250 may be configured to classify the I/O type of RDMA operations for a particular QP as being of the Channel Semantics type.

In some embodiments, the weights assigned to the I/O characteristic may depend on the value of the I/O characteristic, e.g. progressively higher weights can be assigned to a particular type (e.g. Channel Semantics type) when there are more RDMA operations (e.g. RDMA SEND operations) of that type in the IF FT, for a particular QP ID.

With respect to an I/O characteristic being the I/O rate, the adaptive ACK coalescing logic 250 may be configured to aggregate the packet count 514 entries for all the opcode type for a given QP in a sampling period and then assign a weight from 1 to 100 based on the percent utilization of the total available bandwidth by the RDMA packets of that QP.

With respect to an I/O characteristic being the I/O size, the adaptive ACK coalescing logic 250 may be configured to determine if the incoming traffic type is biased towards short payload or large payload.

For example, the adaptive ACK coalescing logic 250 may be configured to determine the average payload size by dividing the total sum of ingress bytes for a particular QP (entries in the byte count 512) by a number of packets for that QP (entries in the packet count 514). The adaptive ACK coalescing logic 250 may then assign the weight as e.g. illustrated in an example 600 shown in FIG. 6, where progressively larger payload sizes are assigned progressively larger weights.

Turning back to the method 400 shown in FIG. 4, the adaptive ACK coalescing logic 250 may then determine the acknowledgement frequency for each QP (box 406) based on the determined I/O characteristics, and, if weights are used, based on their weights. In an embodiment, the determination of an acknowledgement frequency may be carried out by determining an intermediate parameter referred to herein as a coalescing factor. Thus, the adaptive ACK coalescing logic 250 may first determine the coalescing factor based on the determined I/O characteristics for each QP pair, and then determine the acknowledgement frequency based on the value of the coalescing factor. In some embodiments, determining the acknowledgement frequency may involve selecting a particular frequency from a set of predefined frequency values depending on the determined I/O characteristics and/or on the determined coalescing factor.

For example, based on the outcome of sampling, the adaptive ACK coalescing logic 250 may be configured to determine the coalescing factor (CF) as:

$$CF = ((io\_rate\_weight + io\_size\_weight)/2) \times (io\_type\_weight/100),$$

where "io_rate_weight" indicates the weight assigned to the I/O rate determined for a particular QP, "io_size_weight" indicates the weight assigned to the I/O size determined for that QP, and "io_type_weight" indicates the weight assigned to the I/O type determined for that QP.

Using such formula for calculating a coalescing factor results in the coalescing factor being a number between 1 and 100, which, in turn, is used to determine the frequency of acknowledgement generation, as e.g. illustrated in an example 700 shown in FIG. 7. As row 701 of FIG. 7 illustrates, coalescing factor determined, for a particular QP, to be a number between 1 and 10 indicates that the RDMA traffic for this connection is of the lowest latency (i.e. the interruptions due to processing of frequent ACKs are acceptable), in which case acknowledgement frequency may be set to 1, which means that an acknowledgement is sent for every RDMA request for this QP that requires an acknowledgement. On the other hand, as row 702 of FIG. 7 illustrates, coalescing factor determined, for a particular QP, to be a number between 10 and 20 indicates that the RDMA traffic for this connection is of relatively low, but not the lowest latency, in which case acknowledgement frequency may be set to 2, which means that an acknowledgement is sent for every 2 RDMA requests that require an acknowledgement. Continuing with the example of FIG. 7, as row 703 of FIG. 7 illustrates, coalescing factor determined, for a particular QP, to be a number between 20 and 40 indicates that the RDMA traffic for this connection is of moderate latency (i.e. it is preferable to reduce the interruptions due to ACKs), in which case acknowledgement frequency may be set to 4, which means that an acknowledgement is sent for every 4 RDMA requests that require an acknowledgement. Other rows shown in FIG. 7 are self-explanatory in a similar manner.

For example, consider an example for an QP with an average packet size determined to be 2048 bytes, utilizing 60% of bandwidth and mainly using RDMA SEND opcode. Using the formula provided above, the Coalescing Factor may then be calculated as CF=((30+60)/2)×(50/100)=22.5. According to the table shown in FIG. 7, the adaptive ACK coalescing logic 250 would consider the RDMA traffic of this QP as moderate latency traffic type and assign the ACK frequency to be 4, which means, acknowledgement packet is generated after every 4 SEND requests.

The formula for calculating the Coalescing Factor provided above allows biasing the Channel Semantic operations are biased towards lower latency and biasing Memory Semantic operations are biased towards higher throughput. This logic makes this solution unique as it considers both I/O rate and I/O type while generating a Coalescing Factor.

The adaptive ACK coalescing logic 250 may then control that the data processor 208 generates acknowledgements in accordance with the determined acknowledgement frequency for each QP. In other words, the adaptive ACK coalescing logic 250 ensures that the determined acknowledgement frequency for a particular QP is taken into account by the data processor 208 that is responsible for processing the incoming RDMA I/O and generating acknowledgements, as described in greater detail below.

Conventionally, VIC adapter data processors are notified when incoming RDMA operations are completed by the hardware. The software running on the data processors interprets the notification and sends completion event to the host, if necessary. It also generates response based on the RDMA request type. If the RDMA request is SEND or WRITE operation, then it generates Acknowledgement packet and send it to the requestor.

Figure 8:
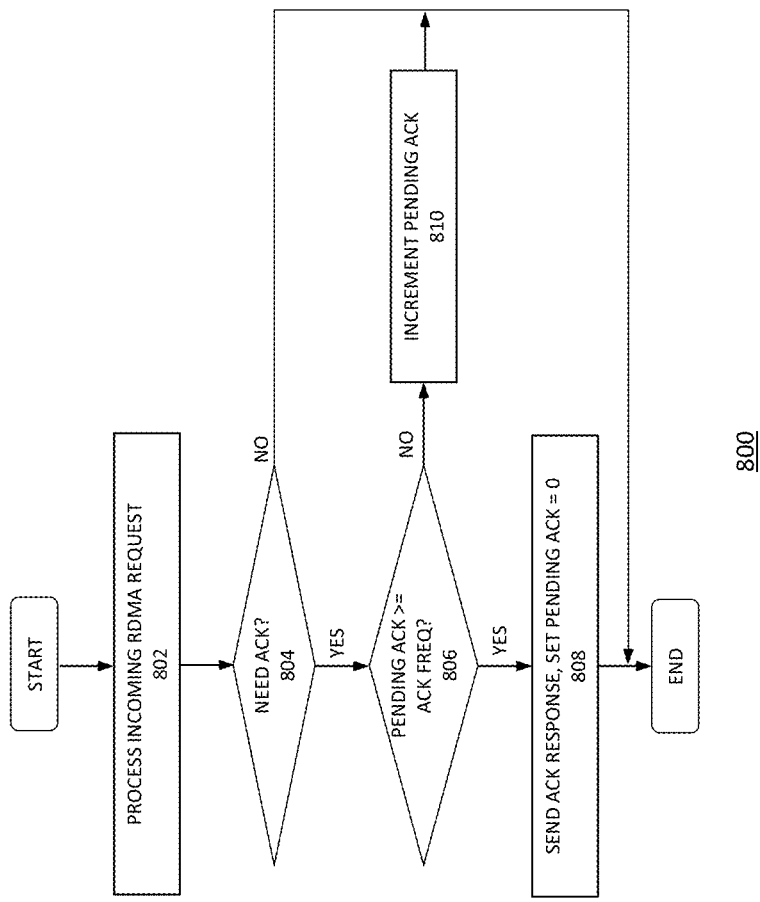
FIG. 8 is a simplified flow diagram illustrating example operations associated with controlling a data processor to send acknowledgements in accordance with the acknowledgement frequency determined for a particular QP, according to some embodiments of the present disclosure.

When the adaptive ACK coalescing described herein is implemented, then the adaptive ACK coalescing logic 250 may perform the checks are illustrated in a flow chart 800 of FIG. 8 in order to make sure that the data processor 208 sends ACKs in accordance with the determined acknowledgement frequency. As shown in FIG. 8, the adaptive ACK coalescing logic 250 may process a particular incoming RDMA request (box 802), e.g. one of the RoCE packets 254, and determine if this particular request requires an acknowledgement (box 804). If so, then the adaptive ACK coalescing logic 250 may determine whether the pending acknowledgement counter is equal to or higher than the acknowledgement frequency set for the QP to which this request belongs (as determined by the QP ID of the request) (box 806). If so, then the adaptive ACK coalescing logic 250 ensures that the data processor 208 generates and sends an ACK, resetting the pending ACK counter (e.g. setting the counter back to zero, if zero was the initial starting value) (box 808). Otherwise the adaptive ACK coalescing logic 250 does not trigger the data processor 208 to generate an ACK, but merely increments the counter of pending ACKs for that QP (box 810) and continues with processing of the next packet.

Figure 9:
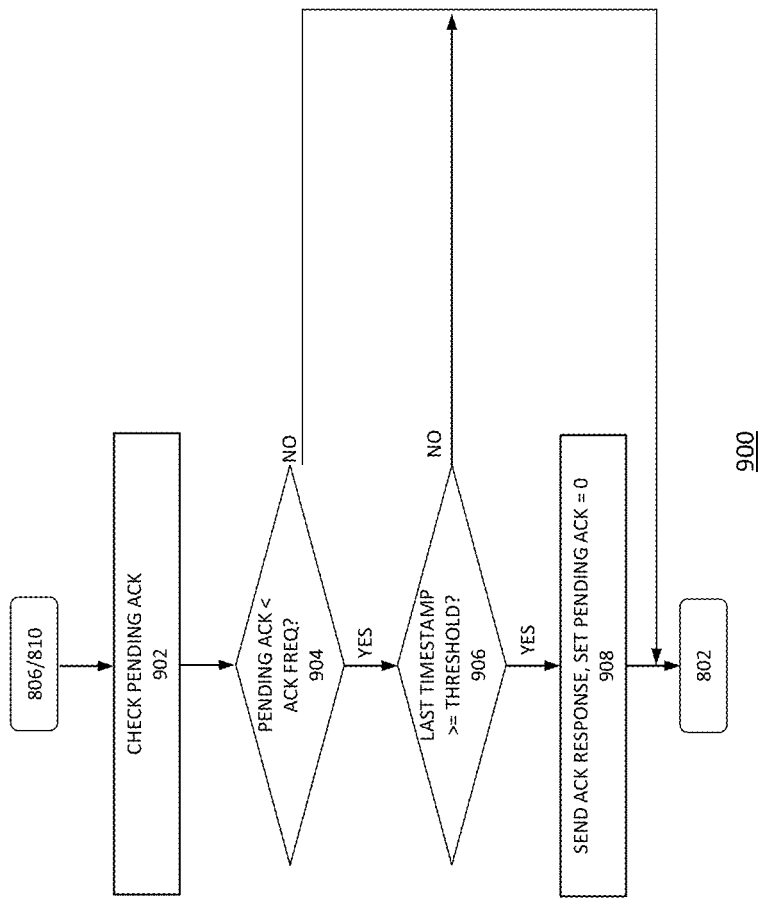
FIG. 9 is a simplified flow diagram illustrating example operations associated with implementing a timestamp sampler, according to some embodiments of the present disclosure.

In some cases, if a particular QP does not have sufficiently frequent I/O operations (i.e. QP is not performing I/O actively), then there might be a chance that pending acknowledgement count will not go above the ACK frequency as determined by the adaptive ACK coalescing logic 250. In this case, the data processor 208 might end up not acknowledging RDMA requests for that QP for quite some time, which may cause RDMA request timeout at the Requestor and that would not be desirable. FIG. 9 illustrates a flow chart 900 of a method that may be implemented in order to avoid such a situation. The method shown in FIG. 9 may start by continuing after box 806 or box 810 of FIG. 8, as illustrated with an arrow from an element containing numbers 806/810 at the beginning of the method of FIG. 9. After the method shown in FIG. 9 is finished, it may proceed to box 802 of the method shown in FIG. 8, as illustrated with an arrow to an element containing number 802 at the end of the method of FIG. 9.

According to the embodiment illustrated in FIG. 9, a logic 300, e.g. within the data processor 208, e.g. the adaptive ACK coalescing logic 250, may be configured to execute a software timer process at a higher frequency. To that end, the logic 300 may be configured to examine the pending acknowledgement count (box 902), e.g. examine is periodically for every QP, and determine whether, for each particular QP, the pending acknowledgement count is less than a certain ACK frequency threshold (box 904). If so, then the logic 300 may be configured to check the timestamp of the last RDMA request for this QP to determine whether the time elapsed between the current time and last RDMA request time is greater than a particular threshold value (box 906). The timestamp is recorded in the flow table entry based on opcode and QP ID (column 510 in the example of FIG. 5). If the time elapsed between the current time and last RDMA request time is higher than some threshold time, then acknowledgement packet is generated for this QP (box 908).

The adaptive coalescing methods described herein are advantageous to the use of Solicited Events as defined by the current Infiniband (IB) specification, as is illustrated with some examples shown in FIGS. 10A and 10B and described below.

When a requestor host channel adapter (HCA), i.e. the VIC adapter associated with a compute node making an RDMA request, performs an RDMA operation such as e.g. WRITE, the target of the WRITE operation is a memory region registered by the responder (i.e. compute node responding to the request). When the responder HCA handles this WRITE request, it provides data directly, using DMA, into the requested memory region and does not notify the RDMA consumer/application on the responder. However, if the requestor application needs to send control data along with RDMA WRITE such that the responder application is notified when it handles incoming WRITE operation, the current IB specification suggests to use RDMA WRITE with IMMEDIATE command with "Solicit Event" bit set in BTH header. Such a "Solicit Event" bit can also be set for SEND, SEND with IMMEDIATE and SEND with INVALIDATE RDMA operations. When responder HCA receives RDMA request with "Solicit Event" bit set to 1, it generates a Completion Queue Event and notifies the consumer/application on the responder. However, the responder still has to generate Acknowledgement packet and send it back to the requestor, so that requestor HCA can complete the pending RDMA operation.

Figure 10A:
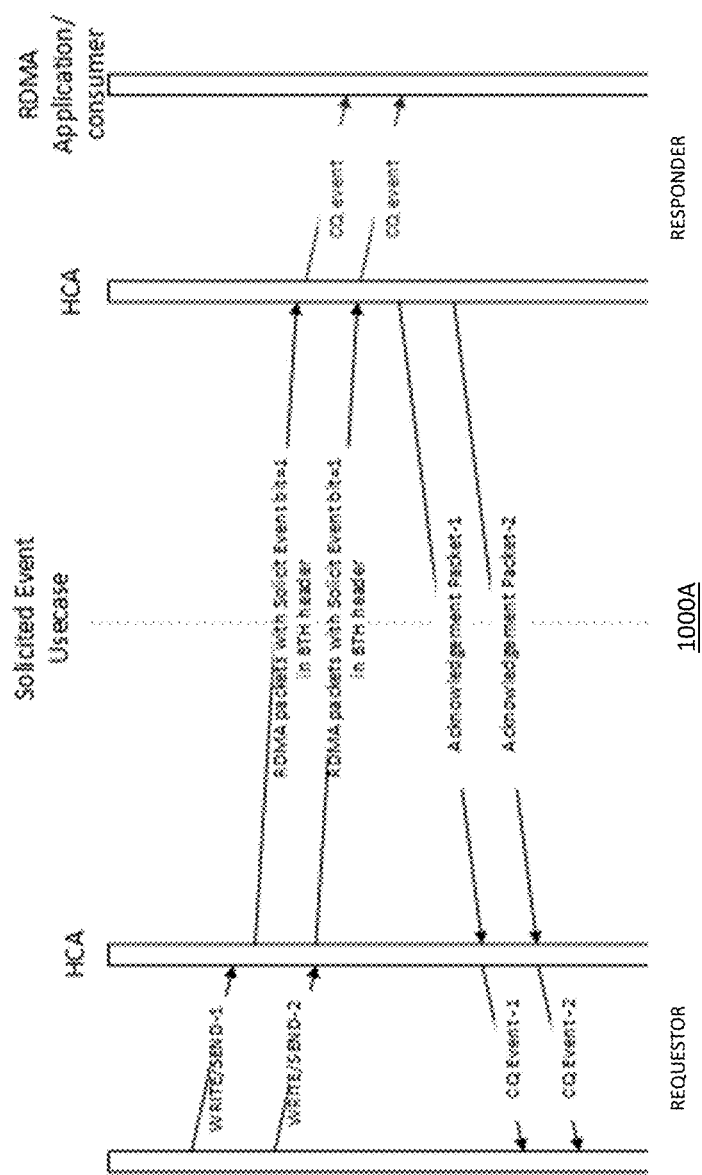
FIG. 10A is a simplified timing diagram illustrating example use case for implementing Solicited Event as defined by current Infiniband specification.
Figure 10B:
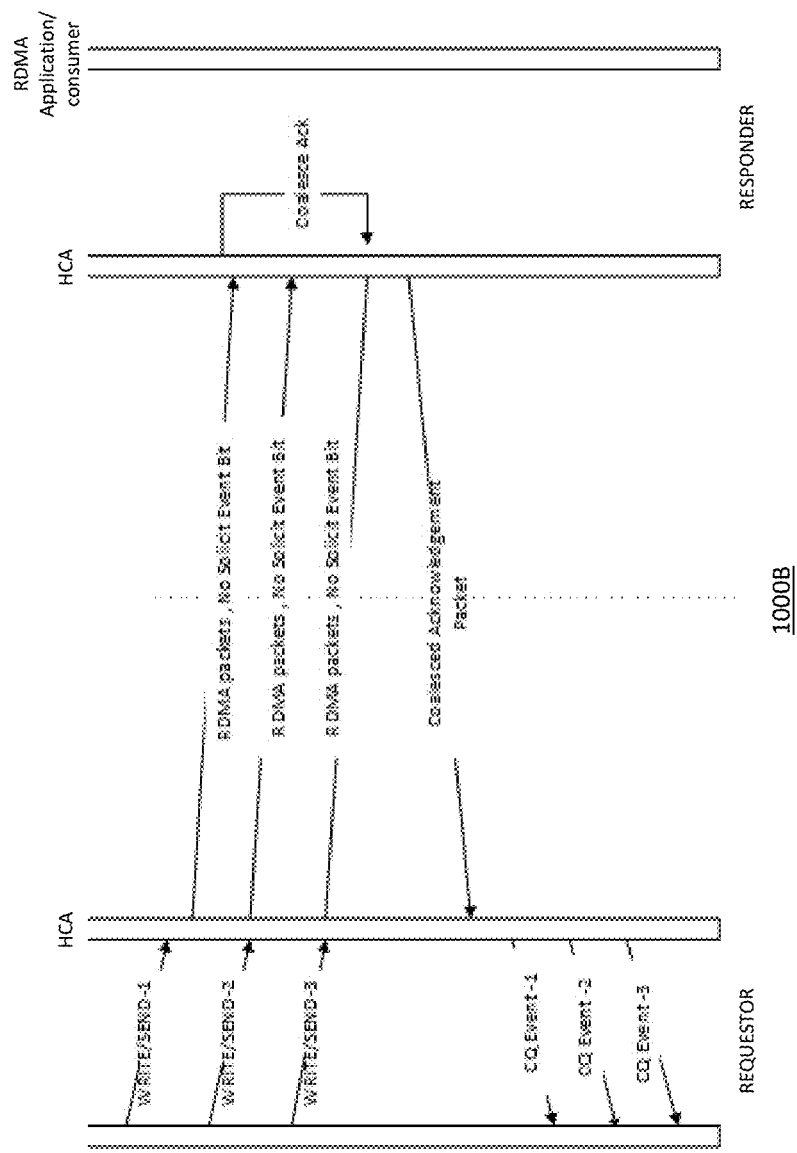
FIG. 10B is a simplified timing diagram illustrating example use case for implementing adaptive coalescing in accordance with one example embodiment.

FIG. 10A illustrates an exemplary set of operations carried when "Solicit Event" bit is set, while FIG. 10B illustrates an exemplary set of operations carried out when the adaptive coalescing method as described herein is implemented.

FIG. 10A depicts the use case where Solicited events are used. For RDMA WRITE operations, the solicited Event usage is not common in RDMA implementations as it increases the CPU overhead on the responder. Even with the use of Solicited Events, the responder still needs to acknowledge the WRITE/SEND requests with separate ACK packets which result in separate interrupt events in the requestor.

FIG. 10B shows the use of adaptive ACK coalescing. According to the adapting coalescing methods described herein, the responder coalesces the acknowledgements and sends a single ACK packet for multiple RDMA requests, thus reducing interrupt overhead and CPU utilization. The HCA at the requestor can generate required completion events derived from single coalesced acknowledgement. Thus, based on the determined traffic pattern, coalescing rate may be varied accordingly.

In summary, there are many shortcomings in interrupt moderation as implemented today. The granularity of moderation is applied at the network interface level and fails to take into consideration the actual type of network traffic, which could be of a great disadvantage in RDMA deployments where an application that is sensitive to latency happens to share the same network interface with an application that is transferring bulk data and, therefore, is not sensitive to latency. Existing implementations of interrupt moderation treat the entire traffic on the network interface and delay the interrupts, which might affect latency sensitive application. On the other hand, adaptive coalescing methods described herein address this problem in RDMA context by classifying the QP traffic type as "latency sensitive" or "throughput oriented" and then adaptively coalesce the acknowledgements for each QP, thus varying the rate of completion/interrupt at the requester.

By virtue of server consolidation, it is not uncommon to find applications and workloads with different I/O characteristics share same network infrastructure. Embodiments described herein help to offer techniques for identifying low latency HPC workloads and high throughput storage or file system I/O and handling them differently.

Some Examples in accordance with various embodiments of the present disclosure are now described.

Example 1 provides a method for adaptively coalescing remote direct memory access (RDMA) acknowledgements, the method including determining one or more input/output (I/O) characteristics of RDMA packets of a plurality of queue pairs (QPs) on a per-QP basis, each QP identifying a RDMA connection between a first compute node and a second compute node; and determining an acknowledgement frequency for providing acknowledgements of the RDMA packets on a per-QP basis based on the determined one or more I/O characteristics.

Example 2 provides the method according to Example 1, further including providing acknowledgements of the RDMA packets on a per-QP basis in accordance for the acknowledgment frequency set for each QP.

Example 3 provides the method according to Examples 1 or 2, where the one or more I/O characteristics include I/O type.

Example 4 provides the method according to Example 3, where the I/O type of RDMA packets of each QP is determined to be a first type when the sampled RDMA packets of the QP include RDMA packets that satisfy a first condition, and is determined to be a second type otherwise.

Example 5 provides the method according to Example 4, where the I/O type of RDMA packets of the each QP is determined to be the first type when the sampled RDMA packets of the QP include a predefined amount of RDMA SEND operations.

Example 6 provides the method according to Example 4, where the I/O type of RDMA packets of the each QP is determined to be the first type when the sampled RDMA packets of the QP include a predefined amount of RDMA READ and RDMA WRITE operations.

Example 7 provides the method according to any one of the preceding Examples, where the one or more I/O characteristics include I/O rate indicating utilization of available bandwidth by RDMA packets of each QP.

Example 8 provides the method according to any one of the preceding Examples, where the one or more I/O characteristics include I/O size indicating average payload of RDMA packets of each QP.

Example 9 provides the method according to any one of the preceding Examples, further including assigning a weight factor to each I/O characteristic of the one or more I/O characteristics of the RDMA packets of each QP; and determining the acknowledgement frequency for the RDMA packets of the each QP based on the weight factor assigned to the each I/O characteristic of the one or more I/O characteristics of the RDMA packets of the each QP.

Example 10 provides the method according to Example 9, where the one or more I/O characteristics of the RDMA packets of each QP comprise an I/O rate, an I/O size, and an I/O type, and determining the acknowledgement frequency comprises determining the acknowledgment frequency based on a coalescing factor (CF), the CF determined as $CF=((io\_rate\_weight+io\_size\_weight)/2)\times(io\_type\_weight/100)$, where io_rate_weight is a weight factor assigned to the I/O rate, io_size_weight is a weight factor assigned to the I/O size, and io_type_weight is a weight factor assigned to the I/O type.

Example 11 provides the method according to any one of the preceding Examples, where the one or more I/O characteristics of the RDMA packets of each QP are determined by sampling the RDMA packets over a period of time.

Example 12 provides the method according to any one of the preceding Examples, where the one or more I/O characteristics of the RDMA packets of each QP are determined based on information stored in one or more RDMA flow tables.

Example 13 provides the method according to any one of Examples 1-12, where the RDMA packets include RDMA over Converged Ethernet (RoCE) version (V) 1 packets.

Example 14 provides the method according to any one of Examples 1-12, where the RDMA packets include RDMA over Converged Ethernet (RoCE) version (V) 2 packets.

Example 15 provides the method according to any one of the preceding Examples, where determining the acknowledgement frequency includes selecting a value from a plurality of predefined values.

Example 16 provides the method according to any one of the preceding Examples, where each compute node includes one or more hardware processors, and/or hosts one or more virtual machines.

Example 17 provides a computer program configured to implement the method according to any one of the preceding Examples.

Example 18 provides a system comprising means for implementing the method according to any one of the preceding Examples.

Example 19 provides a system for adaptively coalescing RDMA acknowledgements, the system including at least one memory element configured to store computer executable instructions, and at least one processor coupled to the at least one memory element and configured, when executing the instructions, to carry out the method according to any one of the preceding Examples.

Example 20 provides one or more non-transitory tangible media encoding logic that include instructions for execution that, when executed by a processor, are operable to perform operations for adaptively coalescing RDMA acknowledgements, the operations comprising operations of the method according to any one of the preceding Examples.

Example 21 provides a data structure for assisting implementation of the method according to any one of the preceding Examples.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments.

Note also that an 'application' as used herein this Specification, can be inclusive of an executable file comprising instructions that can be understood and processed on a computer, and may further include library modules loaded during execution, object files, system files, hardware logic, software logic, or any other executable modules. Furthermore, the words "optimize," "optimization," and related terms are terms of art that refer to improvements in speed and/or efficiency of a specified outcome and do not purport to indicate that a process for achieving the specified outcome has achieved, or is capable of achieving, an "optimal" or perfectly speedy/perfectly efficient state.

In example implementations, at least some portions of the activities outlined herein may be implemented in software in, for example, the VIC adapter 120, 202 and the VIC host driver 108. In some embodiments, one or more of these features may be implemented in hardware, provided external to these elements, or consolidated in any appropriate manner to achieve the intended functionality. The various network elements (e.g., the VIC adapter 120, 202 and the host driver 108) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, the various network elements described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., memory elements 118, 304) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., processor 114, processor 302, data processor 208, control processor 206, packets processors 216 and 226) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 100 may be applicable to other exchanges or routing protocols. Moreover, although communication system 100 has been illustrated with reference to particular elements and operations that facilitate the communication process, these elements, and operations may be replaced by any suitable architecture or process that achieves the intended functionality of communication system 100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method for adaptively coalescing remote direct memory access (RDMA) acknowledgements, the method comprising:
    determining one or more input/output (I/O) characteristics of RDMA packets of a plurality of queue pairs (QPs) on a per-QP basis, each QP identifying a RDMA connection between a first compute node and a second compute node;
    weighting each I/O characteristic of the one or more I/O characteristics of the RDMA packets of each QP to define weighted I/O characteristics; and
    determining an acknowledgement frequency for providing acknowledgements of the RDMA packets on a per-QP basis based on the one or more weighted I/O characteristics of the RDMA packets of the each QP.

2. The method according to claim 1, wherein the one or more I/O characteristics comprise I/O type.

3. The method according to claim 2, wherein the I/O type of RDMA packets of each QP is determined to be a first type when the sampled RDMA packets of the QP include RDMA packets that satisfy a first condition, and is determined to be a second type otherwise.

4. The method according to claim 3, wherein the I/O type of RDMA packets of the each QP is determined to be the first type when the sampled RDMA packets of the QP include a predefined amount of RDMA SEND operations.

5. The method according to claim 3, wherein the I/O type of RDMA packets of the each QP is determined to be the first type when the sampled RDMA packets of the QP include a predefined amount of RDMA READ and RDMA WRITE operations.

6. The method according to claim 1, wherein the one or more I/O characteristics comprise I/O rate indicating utilization of available bandwidth by RDMA packets of each QP.

7. The method according to claim 1, wherein the one or more I/O characteristics comprise I/O size indicating average payload of RDMA packets of each QP.

8. The method according to claim 1, wherein:
    the one or more I/O characteristics of the RDMA packets of each QP comprise an I/O rate, an I/O size, and an I/O type, and
    determining the acknowledgement frequency comprises determining the acknowledgment frequency based on a coalescing factor (CF), the CF determined as CF= ((io_rate_weight+io_size_weight)/2).times.(io_type_weight/100), where io_rate_weight is a weighting of the I/O rate, io_size_weight is a weighting of the I/O size, and io_type_weight is a weighting of the I/O type.

9. A system for adaptively coalescing remote direct memory access (RDMA) acknowledgements, the system comprising: at least one memory element configured to store computer executable instructions, and at least one processor coupled to the at least one memory element and configured, when executing the instructions, to perform operations comprising: determine one or more input/output (I/O) characteristics of RDMA packets of a plurality of queue pairs (QPs) on a per-QP basis, each QP identifying a RDMA connection between a first compute node and a second compute node; weight each I/O characteristic of the one or more I/O characteristics of the RDMA packets of each QP to define weighted I/O characteristics; and determine an acknowledgement frequency for providing acknowledgements of the RDMA packets on a per-QP basis based on the one or more weighted I/O characteristics of the RDMA packets of the each QP.

10. The system according to claim 9, wherein the one or more I/O characteristics comprise I/O type.

11. The system according to claim 10, wherein the I/O type of RDMA packets of each QP is determined to be a first type when the sampled RDMA packets of the QP include RDMA packets that satisfy a first condition, and is determined to be a second type otherwise.

12. The system according to claim 9, wherein the one or more I/O characteristics comprise I/O rate indicating utilization of available bandwidth by RDMA packets of each QP.

13. The system according to claim 9, wherein the one or more I/O characteristics comprise I/O size indicating average payload of RDMA packets of each QP.

14. One or more non-transitory tangible media encoding logic that include instructions for execution that, when executed by a processor, are operable to perform operations for adaptively coalescing remote direct memory access (RDMA) acknowledgements, the operations comprising:
    determining one or more input/output (I/O) characteristics of RDMA packets of a plurality of queue pairs (QPs) on a per-QP basis, each QP identifying a RDMA connection between a first compute node and a second compute node;
    weighting each I/O characteristic of the one or more I/O characteristics of the RDMA packets of each QP to define weighted I/O characteristics; and
    determining an acknowledgement frequency for providing acknowledgements of the RDMA packets on a per-QP basis based on the one or more weighted I/O characteristics of the RDMA packets of the each QP.

15. The media according to claim 14, wherein the one or more I/O characteristics comprise I/O type.

16. The media according to claim 15, wherein the I/O type of RDMA packets of each QP is determined to be a first type when the sampled RDMA packets of the QP include RDMA packets that satisfy a first condition, and is determined to be a second type otherwise.

17. The media according to claim 14, wherein:
    the one or more I/O characteristics of the RDMA packets of each QP comprise an I/O rate, an I/O size, and an I/O type, and
    determining the acknowledgement frequency comprises determining the acknowledgment frequency based on a coalescing factor (CF), the CF determined as CF= ((io_rate_weight+io_size_weight)/2).times.(io_type_weight/100), where io_rate_weight is a weighting of the I/O rate, io_size_weight is a weighting of to the I/O size, and io_type_weight is a weighting of the I/O type.

* * * * *